United States Patent [19]
Kara et al.

[11] Patent Number: 5,323,470
[45] Date of Patent: Jun. 21, 1994

[54] METHOD AND APPARATUS FOR AUTOMATICALLY TRACKING AN OBJECT

[76] Inventors: Atsushi Kara, #145 The Village at Vanderbilt, Nashville, Tenn. 37212; Kazuhiko Kawamura, 5908 Robert E. Lee Dr., Nashville, Tenn. 37215

[21] Appl. No.: 880,537

[22] Filed: May 8, 1992

[51] Int. Cl.$^5$ .......................... G06K 9/00; G06K 9/20; H04N 5/225; G06F 15/00
[52] U.S. Cl. .......................................... 382/1; 382/48; 364/413.02; 395/94; 343/169
[58] Field of Search ......................... 382/1, 2, 42, 48; 358/125, 126; 364/413.02, 413.01, 413.13; 395/94, 924; 901/47

[56] References Cited

U.S. PATENT DOCUMENTS

| | | | |
|---|---|---|---|
| 4,841,575 | 6/1989 | Welsh et al. | 382/2 |
| 4,961,177 | 10/1990 | Uehara | 382/2 |
| 4,975,960 | 12/1990 | Petajan | 382/2 |
| 5,012,522 | 4/1991 | Lambert | 382/48 |
| 5,029,220 | 7/1991 | Juday | 382/6 |
| 5,062,056 | 10/1991 | Lo et al. | 358/126 |
| 5,098,426 | 3/1992 | Sklar et al. | 364/413.02 |
| 5,136,659 | 8/1992 | Kaneko et al. | 382/2 |

OTHER PUBLICATIONS

Atsushi Kara et al., "Intelligent Control of a Robotic Aid System for the Physically Disabled," *Proc. 1991 IEEE Int'l. Symposium on Intelligent Control*, pp. 359–364 (Aug. 13–15, 1991).
A. J. Koivo et al., "Real-Time Vision Feedback for Seroving Robotic Manipulator With Self-Tuning Controller," *IEEE Transactions on Systems, Man, and Cybernetics*, 21(1):134–142 (Jan./Feb. 1991).
R. F. Erlandson et al., "A Robotic System as a Remedial Tool in Rehabilitation," *Proc. of the 1991 Int'l. Cong. on Rehabilitation Robotics*, (Jun. 1991).
Atsushi Kara et al., "Vision-based Control of a Robotic Aid System for the Physically Disabled," Technical Report, CIS-91-02, Center for Intelligent Systems, Vanderbilt University, Nashville, Tenn. (May 1991).
Marcel P. Dijkers et al., "Patient and Staff Acceptance of Robotic Technology in Occupational Therapy: A Pilot Study," *Journal of Rehabilitation Research and Development*, 28(2):33–44 (1991).
N. Papanikolopoulos et al., "Vision and Control Techniques for Robotic Visual Tracking," *1991 IEEE International Conference on Robotics and Automation*, (1991).
Weining Gan et al., "Development of an Intelligent Robotic Aid to the Physically Handicapped," *Proc. 22nd SSST Conference*, (Mar. 1990).
Andreas S. Weigend et al., "Back-Propagation, Weight-Elimination and Time Series Prediction," *Proc. 1990 Summer School IDS Model*, pp. 105–116 (1990).
Joy Hammel et al., "Clinical Evaluation of a Desktop Robotic Assistant," *Journal of Rehabilitation Research and Development*, 26(3):1–16 (1989).
Ernst Dieter Dickmanns et al., "Dynamic Monocular Machine Vision," *Machine Vision and Applications*, 1:223–240 (1988).
Ernst Dieter Dickmanns et al., "Applications of Dynamic Monocular Machine Vision," *Machine Vision and Applications*, 1:241–261 (1988).
H. H. Kwee et al., "The Manus Wheelchair–Borne Manipulator," *First Int'l. Workshop on Robotic Applications in Medical and Health Care*, Ottawa, pp. 2–5 (Jun. 1988).

*Primary Examiner*—Joseph Mancuso
*Assistant Examiner*—David Fox
*Attorney, Agent, or Firm*—Needle & Rosenberg

[57] ABSTRACT

Methods and apparatus for automatically tracking the position of a moving object in real time, particularly the face of a person who is being fed by a robotic system, is disclosed. The object can be tracked by comparing a prestored object model image with the current image of the object using the square-distance criteria. The search area can be limited to a region in which the face is most likely to be found and the prestored object model image can be limited to robust points. The method can include motion prediction, including both continuous motion and sudden motion, such as the motion cause by a person sneezing. Alternatively, a computationally efficient approach employing a one-dimensional algorithm can be used.

23 Claims, 4 Drawing Sheets

METHOD AND APPARATUS FOR AUTOMATICALLY TRACKING AN OBJECT

BACKGROUND OF THE INVENTION

This invention relates to an intelligent robotic aid system for use in tracking and avoiding collision with an object, particularly for use in hospitals and homes. In particular, this invention relates to a robotic aid system which can be used, for instance, to assist the physically disabled user in feeding. This system includes a machine-vision subsystem that tracks the position of an object, such as a person's face, in real time and provides for reflex action.

Hammel et al., *J. Rehabilitation Res. & Dev.*, 26(3):1 (1988), estimate that caring for a quadriplegic veteran, including standard medical treatment, equipment maintenance, and attendant care, cost about $47,000 per year. This amounts to the net direct cost of approximately five billion dollars to the Department of Veterans Affairs for its current quadriplegic population. Engelberger, *Robotics in Service*, The MIT Press (1989), also estimates the cost for a case of spinal cord injury to be $57,000 per patient per year.

Several works, including Hammel et al.; Seamone et al., *J. Rehabilitation Res. & Dev.*, 22(1):38 (1985); Kwee et al., *First Int. Workshop on Robotic Applications in Medical & Health Care*, Ottawa June 1988); Gan et al., *Proceed. of the 22nd Southeastern Symposium on System Theory*, Cookeville, Tenn. (March 1990); and Dijkers et al., *J. Rehabilitation Res. & Dev.*, 28(2):33 (1991), have addressed this problem and demonstrated the feasibility of robotic approaches. Clinical evaluations of prototype robotic aid systems revealed positive acceptance of such systems by many of the users.

Two problems must be solved for a robot to feed a person. First, the robot must continually track the position of the person's face. Second, the robot must be able to get out of the way if the person moves suddenly. The first problem can be solved if the position of the person's face can be tracked in real time. The second problem requires reflex action on the part of the robot. Both problems require the ability to predict and follow human motion. The term reflex is used to denote reactive behaviors against unexpected events.

Because the robot arm operates near the human face, a control mechanism to avoid collision is an indispensable component of the system. In Hammel et al., the robot can be stopped by a voice command STOP, pressing a stop switch, or any loud noise. The instant invention relates to integrating these passive ways of stopping the robot with autonomous collision avoidance by the robot itself. Techniques needed for this purpose are real time face tracking, motion prediction, and reactive/predictive motion planning. Thus, the instant invention enhances the safety of a robotic aid system by allowing for the integration of multiple modalities such as vision, sound, touch-sensors, and switches.

Throughout this application, various publications are referenced. The disclosures of these publications in their entireties are hereby incorporated by reference into this application in order to more fully describe the state of the art to which this invention pertains.

SUMMARY OF THE INVENTION

This invention relates to a method and apparatus for tracking the position of a moving object in real time, such as an article being used in a manufacturing process or, more particularly, the face of a person who is being fed, or otherwise administered to, by a robotic system. This invention allows for real time face tracking, which can include continuous motion prediction and/or the ability to predict a sudden movement of the face. Thus, this invention allows for reactive/predictive motion planning so as to allow a robotic arm to approach the face of a person without colliding with the face. The face of the person can be tracked using either a two-dimensional correlation of time-spaced images of the person's head region or a more computationally efficient one-dimensional approach.

In particular, this invention provides for a method, and associated apparatus to allow practice of this method, of automatically tracking the position of a face of a person in real time to allow controlled feeding of the person by a robot. In particular, this method comprises the steps of (A) positioning a camera such that the camera viewing space defines a two-dimensional image coordinate system; (B) automatically acquiring a model image which includes an image of the face, in which the model image comprises a first two-dimensional array of intensity points referenced to the coordinate system; (C) selecting an initial tracking point in the model image and an initial prediction point in the model image, wherein the tracking point and the prediction point are referenced to the coordinate system; (D) at preselected times, repeating steps E) through I) until feeding is completed; (E) for each preselected time, automatically acquiring a scene image which includes an image of the face, in which the scene image comprises a second two-dimensional array of intensity points referenced to the coordinate system; (F) automatically selecting a rectangular search region within the scene image, in which the search region comprises a subset of the second two-dimensional array of intensity points and includes the intensity point corresponding to the prediction point; (G) automatically locating the best match point between the second intensity points in the search region and the first intensity points in the model image such that the coordinates of the best match point corresponds to the minimum of the square-distance criterion; (H) automatically equating the best match point with the tracking point for the particular preselected time; and (I) automatically comparing the tracking point for the particular preselected time to the tracking point of a previous preselected time, such as by employing an auto-regressive method, a constant velocity method, a constant acceleration method and a least-squares method, to select the prediction point for the particular preselected time. Further, the size of the search region can be optimized to enhance the speed at which the position of the face can be tracked. Additionally, the speed at which the position of the face can be tracked can be enhanced by, for each cycle of repeated steps (E) through (G), performing the steps of i) storing the value of the square distance criterion associated with each first intensity point in the model image for the particular preselected time; ii) selecting the set of first intensity points in the model image in which the value of the square distance criterion associated with each first intensity point remains less than a predetermined threshold value for a predetermined set of preselected times to create an array of robust intensity points; and iii) limiting the model image first two-dimensional array to the robust intensity points. Sudden motion of the face can be predicted by correlating a time series of at least one variable associated with sudden motion, such as the minimum of the square-distance criterion, in a time-delay neural network trained with a back-propagation algorithm.

Further, this invention provides for a method, and associated apparatus to allow practice of this method, of automatically tracking the position of a face of a person in real time to allow controlled feeding of the person by a robot, comprising the steps of (A) automatically acquiring a model image which includes an image of the face surrounded by a background, in which the model image comprises a two-dimensional array of intensity points such that the intensity values of the intensity points corresponding to the background distinguishably contrast with the intensity values of the intensity points corresponding to the edge of the face so that the intensity points corresponding to the edge of the face can be determined by intensity thresholding; (B) selecting an initial tracking point ($X_{init}$, $Y_{init}$) in the model image such that the initial tracking point corresponds to a position within the image of the automatically examining the horizontal line of intensity points containing the initial point to identify the intensity point $X_{min}$, which corresponds to the intensity point that identifies the right edge of the face on the horizontal line, and to identify the intensity point $X_{max}$, which corresponds to the intensity point that identifies the left edge of the face on the horizontal line, and to identify $X_{track}$, which equals $(X_{min}+X_{max})/2$; (D) automatically examining the vertical line of intensity points containing the intensity point ($X_{track}$, $Y_{init}$) to identify the intensity point $Y_{min}$, which corresponds to the intensity point that identifies the top edge of the face on the vertical line; (E) setting $Y_{tract}=Y_{min}+D$, wherein D is a predefined constant related to the distance between the top edge of the face and the mouth of the face, to define the tracking point ($X_{tract}$, $Y_{tract}$); and (F) at preselected times, repeating steps A) through E) until feeding is completed to track the position of the face of the person.

DETAILED DESCRIPTION OF THE INVENTION

The invention described herein is reported in Kara et al., *Technical Report* CIS-91-02, Center for Intelligent Systems, Vanderbilt University (dated May 8, 1991) and Kara et al., *Proc. of the 1991 IEEE Int. Symposium on Intelligent Control*, Arlington, Va. (Aug. 13–15, 1991), which publications are hereby incorporated in their entireties by reference. This invention can be used in conjunction with a unique robotic arm called Soft Arm which was developed by Bridgestone Corporation. The Soft Arm is a five degree-of-freedom manipulator, which is pneumatically controlled by a microprocessor-based controller. The Soft Arm uses rubbertuators, which are pneumatic actuators that operate in a manner resembling the movements of the human muscle, are lightweight, have a high power-to-weight ratio, and have inherent compliance control characteristics.

One of the goals of the system of the instant invention is to assist in feeding a disabled person, such as a person with any partial or complete upper limb paralysis. It is assumed that the user can control the robot through voice commands. A tentative scenario of the task is as follows. The system first receives a voice command "feed me soup". It then looks for a spoon and a soup bowl on the table using a video camera. The robot picks up the spoon and scoops up the soup. A face tracking system continuously monitors the current position of the user's face. The robot brings the spoon to a safe distance from the user's mouth and steadily remains there while he is eating. The user can control the pacing through commands "closer" or "move away". The perturbation of the spoon caused while the user is eating is sensed by the controller. This triggers the process of going back to the bowl and getting more soup. On receiving the command "no more soup," the robot puts the spoon back on the table and returns to its home position.

Figure 1:
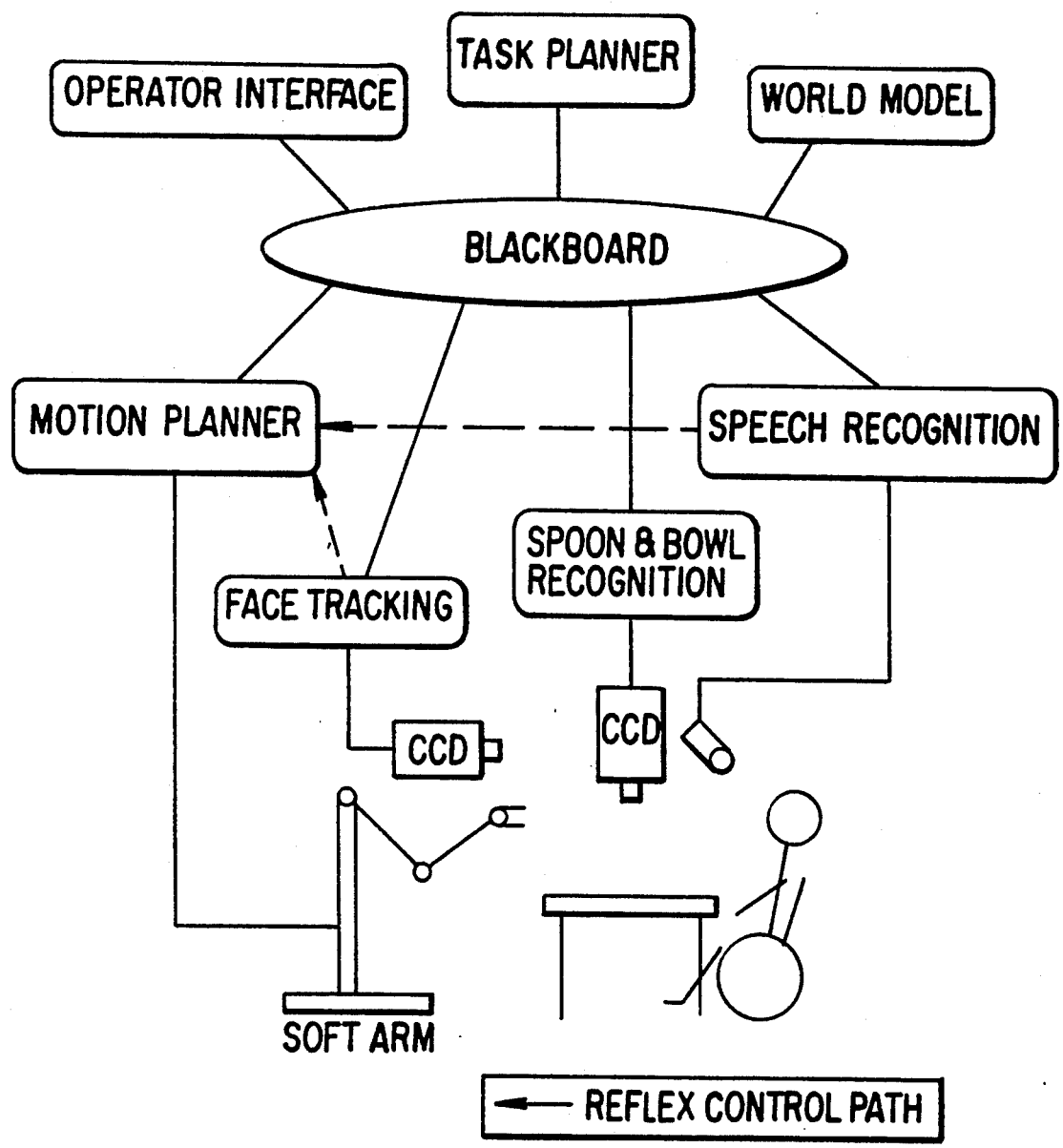
FIG. 1 shows the system configuration of the intelligent robotic aid system according to the present invention.

FIG. 1 shows a system configuration of an intelligent robotic aid system according to the instant invention. Two CCD cameras can be used to monitor the robot workspace. One monitors the table from above and the other one, in front of the user, monitors the user's face. A workstation equipped with an image processing board is used to capture images, such as from up to four CCD cameras. A PC-based voice recognition and synthesis system, such as Intro Voice VI (Voice Connection, Irvine, Calif.), is used as the user interface. The control software is distributed among several interconnected workstations, such as through an Ethernet LAN. The Soft Arm controller and the voice system are interfaced with the workstations through RS232C serial lines. Transputers can be used for parallel control of the Soft Arm joints.

The main control scenario of the robotic aid system discussed above is straightforward. However, unlike industrial robots, interactive control for unexpected events plays a more important role in the system of the instant invention than task-level planning. Thus, this invention focuses on reactive/predictive control issues for controlling the manipulator.

One of the possible causes of collision is a sudden movement of the user due to sneezing, coughing, or possibly spasms. The mechanical flexibility of the Soft Arm may also cause collision if it is suddenly pushed by someone. On the other hand, the robot arm has to operate as close as possible to the user's face to provide comfortable service. In order to meet such contradictory requirements, the following issues were addressed: visual tracking of the face, the end-effector and the held object; human motion prediction; dynamic planning of an approach trajectory to the moving face; collision prediction and detection; planning of the collision avoidance strategy; criteria to activate or deactivate the collision avoidance action; and re-planning of the service scenario after the interruption of the initial plan by a collision avoidance action.

The constraint of real-time response is imperative in solving these problems. For collision avoidance in the configuration of the robot arm and the user's face given above, the system must react within around 200 milliseconds. In given hardware limitations, this constraint excludes any time-consuming computational algorithms.

A. FACE TRACKING—TWO DIMENSIONAL APPROACH

Face tracking is needed for planning the approach path to the face and for collision prediction/detection. The face tracking system continuously monitors the scene through mounted CCD cameras. The cameras are directed toward the front and side view of the patient sitting in a wheel-chair.

The two-dimensional approach of the instant invention employs a tracking algorithm that is a variation of controlled correlation (Dickmanns et al., *Machine Vision and Applications*, 1:223 (1988)). The method searches for the object in the image by comparing a pre-stored image of the object with the current image from the camera. The search area is limited to a region the face is most likely to be found in. Motion predition of the face gives the next search region.

In controlled correlation, images are compared using cross-correlation, or a matched filter. Instead of cross-correlation, the instant invention employs the square-distance criterion Dist(x,y,t), which is defined as:

$$Dist(x,y,t) = \sum_{(u,v) \in \text{Model}} [I_{scene}(x + u, y + v, t) - I_{model}(u,v)]^2 \quad \text{(Eq. 1)}$$

where $I_{scene}(x,y,t)$ and $I_{model}(u,v)$ are the intensity of the image (at time t) and model respectively. The symbol t denotes time, either discrete or continuous. The best match point (x,y) at time t is given by the minimum of Dist(x,y,t). The square distance is used because the precise location of the tracked object and a high confidence level that the object recognized by the system is exactly the model, not anything else, is desired. That is, in the square distance criterion, $Dist(x_0,y_0,t) = 0$ means the image exactly matches the model at $(x_0,y_0)$. On the other hand, using cross-correlation, $Corr(x_0,y_0t) = \text{maximum}$ does not necessarily mean the exact match.

An outline of the method of one embodiment of the instant invention follows:

Definitions x and y: The 2-D image coordinates the scene. $0 \leq x < X_{max}$, $0 \leq y < Y_{max}$. Assume that $(x,y) = (0,0)$ corresponds to the upper-left corner of the scene image and $(x,y) = (X_{max}, Y_{max})$ the lower-right corner.

u and v: The 2-D image coordinates of the model. $0 \leq u < U_{max}$, $0 \leq v < V_{max}$. Assume that $(u,v) = (0,0)$ corresponds to the upper-left corner of the model and $(u,v) = (U_{max}, V_{max})$ the lower-right corner.

$I_{scene}(x,y,t)$: The gray-scale image of the scene at time t, where $0 \leq t < \infty$, and $0 \leq I_{scene} < I_{max}$. Assume the sampling period $\Delta t = 1$.

$I_{model}(u,v)$: the gray-scale image of the object tot be tracked. $0 \leq I_{model} < I_{max}$.

$X_{track}$ and $Y_{track}$: The image coordinates of the current tracking point.

$X_{predict}$ and $Y_{predict}$: The image coordinates of the predicted tracking point.

S(x,y,D): A rectangular search region defined as $S(x,y,D) = \{(\xi, \eta) | x - D \leq \xi < x + D, y - D \leq \eta < y + D,$ and $D \geq 0\}$. The choice of the positive value D on the computational cost is discussed below.

History-Queue: A data structure to store the past values of $X_{track}$ and $Y_{track}$. This queue is referred to when predicting the motion.

Procedure

Step 1 [Acquire a Model Image] Take a snapshot of the scene and initialize $I_{model}(u,v)$ to the image of the tracked object. The size of the model ($U_{model}$ and $V_{model}$) must be small enough so that minimal background scene is included in the model image. Also the size must be large enough so that the model can discriminate the object from other parts of the scene. Let $t = 0$. Initialize $X_{track}$, $Y_{track}$, $X_{predict}$ and $Y_{predict}$ to the current position of the model. That is, place $(X_{track}, Y_{track})$ and $(X_{predict}, Y_{predict})$ on the point corresponding to $(u,v) = (0,0)$ (upper-left corner of the model image in the scene.) Push the values of $X_{track}$ and $Y_{track}$ into the History-Queue.

Step 2 [Snapshot] Take a snapshot of the scene and fill the array $I_{scene}(x,y,t)$.

Step 3 [Search] Compute the Square Distance: Dist(x,y,t) between the scene and the model in the search region $S(X_{predict}, Y_{predict}, D)$. Set $(X_{track}, Y_{track})$ to the coordinates of the point where Dist(x,y,t) is minimum. Push the values of $X_{track}$ and $Y_{track}$ into the History-Queue.

Step 4 [Predict the Next Search Region] If $t \leq 1$ set $(X_{predict}, Y_{predict})$ to $(X_{track}, Y_{track})$. Else if $t > 1$ then read the latest two coordinates of the tracking points (i.e., $X_{track}(t-1)$, $Y_{track}(t-1)$) and $((X_{track}(t), Y_{track}(t)))$ in the History-Queue. For prediction based on the constant-velocity model (see below for other motion prediction methods), set $$X_{predict} := 2X_{track}(t) - X_{track}(t-1)$$

$$Y_{predict} := 2Y_{track}(t) - Y_{track}(t-1)$$

Endif.

Set $t := t + 1$ and go to Step 2.

In one experimental embodiment, the model image is sampled every 4 pixels from a 64-by-64 rectangle in an image. Thus a model image contains 16-by-16 pixels with 256 intensity levels for each pixel. The search region is a 80-by-80 rectangle. In this configuration, the search of the best match position can be done at the speed of around 10 image frames per second.

Computational Cost of the Algorithm

It can be easily seen from the above description of the algorithm that most of the computation is spent searching for the minimum of the function Dist(x,y,t) in Step 3. In this section, the computational cost of the above algorithm is analyzed.

Let M and S be the computational cost (= time) for a single multiplication (or division) and subtraction (or addition), respectively, assume that M and S are constant, and neglect the costs of other operations such as substitutions and comparisons. The computational cost Cost(x,y,t) for calculating the value of Dist(x,y,t) for a single point (x,y) at time t is:

$$Cost(x,y) = U_{max} V_{max}(M + S)$$

Since a search region S(x,y,D) contains $4D^2$ points, the total cost for calculating Dist(x,y,t) on S(x,y,D) at time t (i.e., per image frame) is:

$$Cost = \sum_{(x,y) \in S(x,y,D)} Cost(x,y,t) = 4D^2 U_{max} V_{max}(M + S)$$

So far we assumed that the sampling period $\Delta t = 1$. Thus, D is the maximum speed in which the tracked object can move in the image. However, when the Cost is high, the cost affects the sampling period also. Let's assume a sequential computational model where the image sampling and computation alternate as follows:

Snapshot→Computation→Snapshot→Computation→ ...

In this model, the sampling period $\Delta t$ increases linearly with respect to the computation cost. That is, $$\Delta t = aCost + b$$

for some $0 < a, b < \infty$. Then the maximum speed in which the tracked object can move (D') is:

$$D' = \frac{D}{\Delta t} = \frac{D}{aCost + b} = \frac{D}{4aD^2 U_{max} V_{max}(M + S) + b}$$

Figure 2:
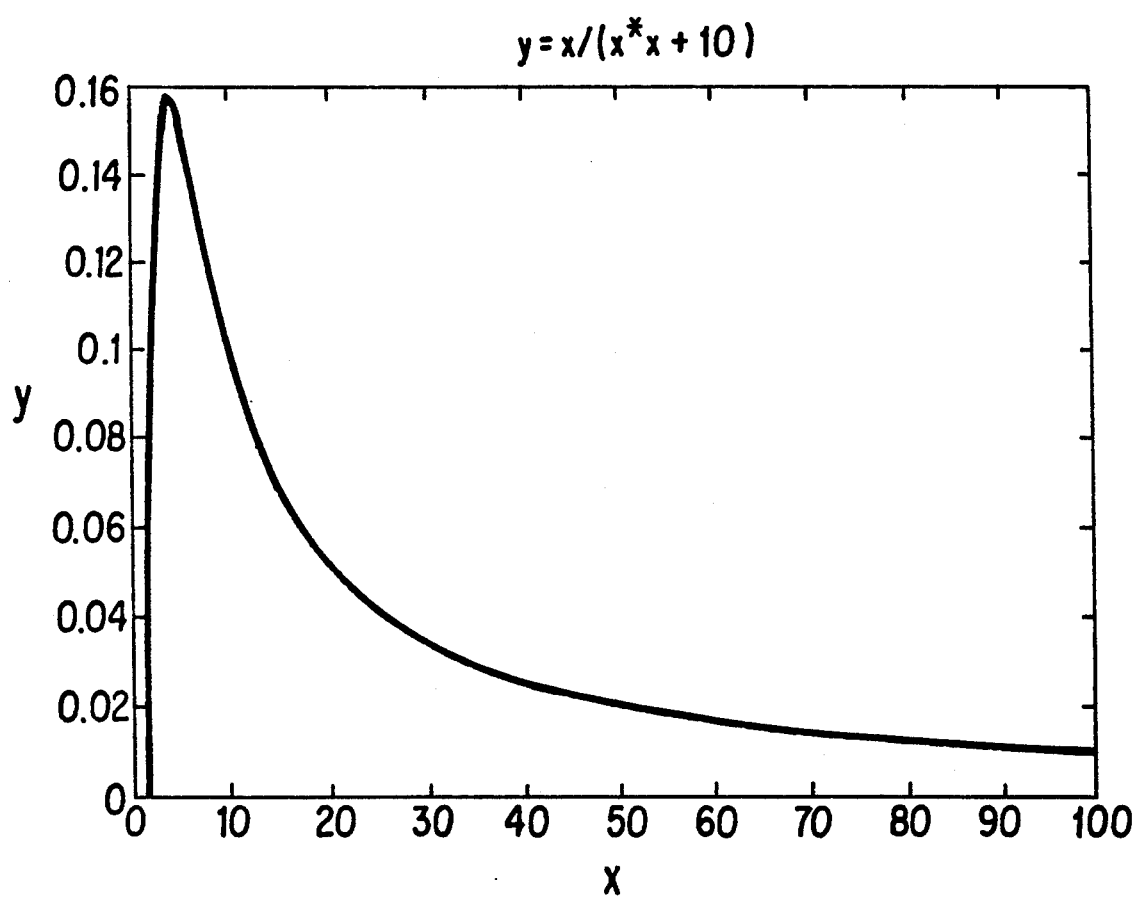
FIG. 2 shows a plot of the search region size vs. tracking performance according to the present invention.

An example of the shape of this function (D' vs. D) is shown in FIG. 2. The curve has a peak at:

$$D = \sqrt{\frac{b}{4a U_{max} V_{max}(M + S)}}$$

and drops rapidly after the peak. The implication is that there is an optimal size of the search region. The tracking performance rapidly deteriorates after exceeding the optimal size. This observation favors the "small-windows" approach in dynamic vision.

Limitations

There are obvious drawbacks in the above approach: 1) The change in orientation of the face can cause a large mismatch between the image and model; 2) If the face is moved outside the search region before the next image is taken and motion prediction fails, the system will not be able to find the face any more; and 3) The distance of the face from the camera is not known.

The problem of recognizing a face with different 3-D poses is a problem in computer vision. This problem can be addressed with the use of stable points, as discussed in more depth below. A stable point is a pixel in the model where $Dist(x,y,t)$ remains small over time. Each stable point corresponds to a surface patch with nearly uniform radiance to different directions. It is easy to identify stable points by observing $Dist(x,y,t)$ for a certain period of time and image matching becomes less expensive and more robust by using only the stable points. For the second problem, one effective method to recover from mistracking is to subtract two consecutive images. The intensity changes indicate the positions of moving objects. The search can be restricted to the points where the intensity change is detected. For the third problem, the assumtion that the face stays approximately in a plane perpendicular to the optical axis with a fixed distance from the camera is used. Alternatively, a stereo-based vision subsystem to measure the distance can be used.

Learning Optimal Sampling

One approach to increase the speed of the face tracking system is to reduce the number of pixels ($= U_{max} V_{max}$) in the model. However, just reducing the size of the model would cause the model to match a wider range of patterns in the image.

An alternative way is to use only the model pixels which are effective in the model-target matching. A pixel in the model is effective if it matches with the corresponding pixel of the target well in spite of the changes of the pose of the target. Let $$I_{target}(u,v,t)(0 \leq u < U_{max}, 0 \leq v < V_{max})$$

be the sequence of the best match images of the target found by the face tracking algorithm. The average error of a pixel (u,v) in the model $I_{model}(u,v)$ is defined as the average of square errors. That is, $$Err(u,v,t) = \frac{1}{t} \sum_{0 \leq \tau < t} (I_{target}(u,v,\tau) - I_{model}(u,v))^2$$

The cost of model-target matching can be reduced without sacrificing the selectivity of the model by using only pixels with low average error, i.e., pixels with $Err(u,v,t) < Err_{threshold}$. We call such pixels, robust.

Finding the robust pixels is approximately equivalent to finding the orientation-independent surface patches. A patch in an image is an equal-intensity area. The patch remains stable if the reflectance from the patch does not change depending on the orientation of the patch, and no other object covers or over-shadows it.

The calculation of $Err(u,v,t)$ needs some caution since it includes the time t which increases toward infinity. In order to avoid the overflow, the averaging can be limited to past T samples. That is, $$Err_T(u,v,t) = \frac{1}{T} \sum_{t-T \leq \tau < t} (I_{target}(u,v,\tau) - I_{model}(u,v))^2$$

The average error should be updated for every sampling time. The summation in the formula can be dispensed with by using the previous value of the robustness.

$$Err_T(u,v,t) =$$
$$\frac{1}{T} (I_{target}(u,v,t) - I_{model}(u,v))^2 + \frac{T-1}{T} Err_T(u,v,t-1)$$

The computational cost of $Err_T$ for a single pixel using this formula is:

$$Cost_{Err}(u,v) = 4M + 2S$$

Thus the cost for one image sample is:

$$Cost_{Err} = \sum_{(u,v)} (4M + 2S) = (4M + 2S) U_{max} V_{max}$$

Suppose only $4D^2 k$ ($0 < k < 1$) pixels are used for matching by thresholding only effective pixels using the robustness criterion. The search cost now becomes:

$$Cost' = kCost + Cost_{Err} = (4D^2 k(M+S) + 4M + 2S) U_{max} V_{max}$$

Therefore, the necessary and sufficient condition that the use of robustness contributes to the performance improvement is:

$$Cost' < Cost \rightleftarrows 4D^2k(M + S) + 4M + 2S < 4D^2(M + S)$$
$$\rightleftarrows k < 1 - \frac{2M + S}{2D^2(M + S)}$$

If M=S is assumed, the inequality reduces to $$k < 1 - \frac{3}{4D^2}$$

For $D \geq 1$, this inequality is always solvable for k. That is, by choosing an appropriate k, the robustness criterion can enhance the performance. Another advantage of using only robust points is that the initial image of the model can include some background scene. If the background scene does not match well, its points are automatically removed from the comparison procedure.

Recovery from Mistracking

The face tracking algorithm fails when the target object moves quickly with a speed exceeding the maximum tracking speed unless the motion prediction predicts the next search region correctly. When failure occurs, a global search of the target must be invoked. However, the computational cost for global search is very high. We briefly summarize three possible approaches to the problem, i.e., motion detection, pyramid, and distributed processing.

When mistracking has occurred, the target is very likely to be moving quickly. There are several techniques to detect motion from a sequence of images. The apparent velocity in the image in terms of the image coordinates can be calculated as follows.

$$v_x(x,y,t) = - \frac{\partial I_{image}(x,y,t)/\partial t}{\partial I_{image}(x,y,t)/\partial x}$$

$$v_y(x,y,t) = - \frac{\partial I_{image}(x,y,t)/\partial t}{\partial I_{image}(x,y,t)/\partial y}$$

After detecting the motion, the search can be restricted to the pixels where the velocity is higher than a certain threshold. In the experimental environment described above, the target is a human sitting in a wheelchair. The movement of the target is mostly limited to horizontal directions. In such a condition, the search can be restricted to a one dimensional horizontal line, thus greatly reducing the computational cost.

Pyramid architecture is an efficient way to implement multiscale representation and computation. A pyramid consists of a sequence of images, each of which is constructed from the previous image by applying certain image operators. Suppose the image operator is a simple blurring function which maps four adjacent pixels into a pixel with an average intensity of the four pixels. That is, $$I^{k+1}_{image}(x,y,t) = \frac{1}{4} \sum_{i,j} I^k_{image}(2x + i, 2y + j, t)$$

where
$$I_{image}^0(x,y,t) = I_{image}(x,y,t)$$

$k = 0, 1, 2, 3, \ldots$, and $$(i,j) \in \{(0,0),(0,1),(1,0),(1,1)\}$$

In this architecture, the model image must also be blurred using the same rule. Since the k-th image consists of only $\frac{1}{4^k}$ pixels, the model search is much less expensive in higher layers. Thus, the top-down search of the model through the pyramid hierarchy can be very efficient. On the other hand, the real-time construction of the pyramid requires a fine-grain parallelism of the processing hardware. When such hardware becomes available in low costs, pyramid architecture will enjoy its application to a wide range of image processing problems.

Coarse-grain parallelism of the underlying processing hardware could also help speed up the search. In a distributed processing architecture without a shared memory (e.g. the hypercube network used by transputers etc.), one of the simplest ways to assign tasks to each of the processing elements (PEs) is to divide and distribute the image to each PE. Each PE will look for the target in a given portion of the image only. The potential power of this distributed processing is very large. However, the power of distributed processing is often crippled by communications overhead. The inter-PE communications such as data distribution, data collection, and synchronization can easily nullify the gain from the parallelism. The algorithm should be decomposed into parallel processes such that no massive data exchange between PEs occurs and PEs do not waste much of their time just waiting for some system resources, or other PE's output. Solid analyses of the optimal processing and communications costs are indispensable for the successful design of such a distributed system. The difficulty of the program development and error elimination of distributed systems is also a major obstacle, especially for research activities where short-cycle prototyping is important.

B. HUMAN MOTION PREDICTION

The reason that motion prediction is important for the robotic-aid system of the instant invention is twofold. First, it can enhance the performance of the face tracking method. The current face tracking algorithm performs a search for the model in the image. Since image matching is time-consuming, the search region is restricted to a small rectangle surrounding the current tracking point. Motion prediction reduces the search space. For this purpose, motion prediction at time=t+1 (i.e., for next image frame) is important (assuming that the unit of sampling time is 1). Second, it is necessary for collision avoidance. A longer range motion prediction, such as for time=t+k (k=3,4,5,...), is important for this purpose to give enough time for the motion planner to take preventive action. Time-series prediction is a classic problem and many estimation techniques are available, including the auto-regressive model, constant velocity/acceleration model and least squares based on time model.

Auto-Regressive Model

The auto-regressive discrete-time model could be used to predict motion predictor the trajectory of the moving target. The moving target is assumed to follow a smooth motion with its position and velocity being continuous. Let x(t) be the x position of the face in the image at time t. The idea is to represent the new position (at time t+1) as a linear combination of a finite number (N) of past positions. That is, $$x(t+1) = \sum_{i=0}^{N-1} a_i x(t-i) + err(t+1)$$

where err(t) is the estimation error at time t. The coefficients $a_i$ ($0 \leq i < N-1$) can be found through least-square fitting, which minimizes the sum of the square errors (SSE). That is, $$SSE = \sum_{i=0}^{N-1} [err(t-i)]^2$$

The minimum of SSE is obtained by differentiating it with $a_i$'s and equating to 0. That is, $$\frac{\partial}{\partial a_i} SSE = 0 \quad (\text{for } i \leq 0 < N-1)$$

These N linear equations (in terms of $a_i$'s) give a set of $a_i$'s. These values are then used to predict x(t+1). One (potential) problem of the autoregressive model is that it involves a matrix inversion of size N to obtain the coefficients. Since the matrix inversion is performed in each time step, N is restricted by the speed of the mathematical operation of the computer used.

Constant Velocity/Acceleration Model

We are also using simpler methods for motion prediction as follows. Let $\vec{x}(t)$ be the position of the face in the image at time t. A method to predict the motion is to assume a constant velocity. That is, by assuming $\partial/\partial t[\vec{x}(t+i)] = \partial/\partial t[\vec{x}(t)]$ (i=1,2...,k), we obtain a set of recursive equations:

$$x_e(t+i) = x_e(t+i-1) + x(t) \quad (\text{for } 0 < i \leq k)$$

which yields:

$$x_e(t+k) = x(t) + kx(t)$$

where $\vec{x}_e(t+k)$ is the estimation of $\vec{x}(t+k)$.

Another method is to assume a constant acceleration. That is, by assuming $\partial^2/\partial t^2[\vec{x}(t+i)] = \partial^2/\partial^2[\vec{x}(t)]$ (i=1,2, ..., k), we obtain recursive equations:

$$x_e(t+i) = x_e(t+i-1) + x(t) \quad (\text{for } 0 < i \leq k)$$

which yields:

$$x_e(t+i) = x(t) + i\, x(t) \quad (\text{for } 0 < i \leq k)$$

Thus, $$x_e(t+k) = x(t) + \sum_{i=0}^{k-1} x_e(t+i) =$$

$$x(t) + kx(t) + \frac{k(k-1)}{2} x(t)$$

Least Squares based on Time

One of the well known methods for time series prediction is to use a polynomial model in terms of time. That is, $$x(t+1) = \sum_{i=0}^{N-1} b_i t^i + err(t+1)$$

where err(t) is the estimation error at time t. The coefficients $b_i$ ($0 \leq i < N-1$) can again be found through the least-square fitting which minimizes the sum of the square errors (SSE.) That is, $$SSE = \sum_{i=0}^{N-1} [err(t-i)]^2$$

Same as the auto-regressive model, the minimum of SSE is obtained by differentiating it with $b_i$'s and equating to 0. That is, $$\frac{\partial}{\partial b_i} SSE = 0 \quad (\text{for } i \leq 0 < N-1)$$

Experimental Results

Table 1 summarizes the performance of various prediction methods used in the method of the instant invention in terms of two error criteria: the peak error and sum-of-square error (SSE). The Least Squares method in the table shows results for a simple model:

$$x(t+1) = bt + err(t+1)$$

with $$SSE = \sum_{i=0}^{N-1} [err(t-i)]^2$$

for N=3, 4, 5, and 6.

TABLE 1

| Motion Prediction Performance | | |
|---|---|---|
| Prediction Method | Peak Error (Pixels) | SSE (Pixels) |
| Constant Velocity | 224 | 207360 |
| Constant Acceleration | 376 | 730960 |
| Least Squares (3 points) | 232 | 181046 |
| Least Squares (4 points) | 160 | 134195 |
| Least Squares (5 points) | 141 | 116236 |
| Least Squares (6 points) | 147 | 115840 |

C. PREDICTING SUDDEN MOTION

This section describes one approach to the problem of predicting sudden motion, such as sneezing and coughing, using a neural network. The classical methods for time-series prediction perform well only if the motion is smooth with respect to some smoothness criterion or if the system dynamics of the target is known. In sneezing and coughing motions, neither of these preconditions are likely to hold. Therefore classical methods fail exactly when the prediction is needed.

One approach to the problem is to apply machine learning methods. The human body tends to exhibit characteristic motion patterns preceding the sneezing or coughing. If these motion patterns share some features such that they consistently herald a sudden motion, a learning algorithm should be able to learn the patterns to predict sudden motions.

A Neural-Network Approach

Time-series prediction using a neural network is one of the promising approaches. Weigend et al., Back-Propagation, Weight-Elimination and Time Series Prediction, *Connectionist Models, Proceedings of the 1990 Summer School*, Touretzky et al. (eds.), Morgan Kaufmann Publishers Inc., pp 105-116 (1991), report that a neutral network was trained using the error-back propagation algorithm to predict the sunspot numbers. The sunspot numbers exhibit a quasi-periodic time series pattern, but the dynamics governing the pattern is not known. Weigend et al.'s neural network was able to predict the sunspot numbers better than the threshold auto-regressive model which was the best predictor so far for the sunspot problem.

The human motion and sunspot number prediction problems share the chaotic nature of the behavior. Since we do not know the target dynamics, the only clue for prediction is to learn from the past measurements the correlation between a specific pattern and its outcome.

Figure 3:
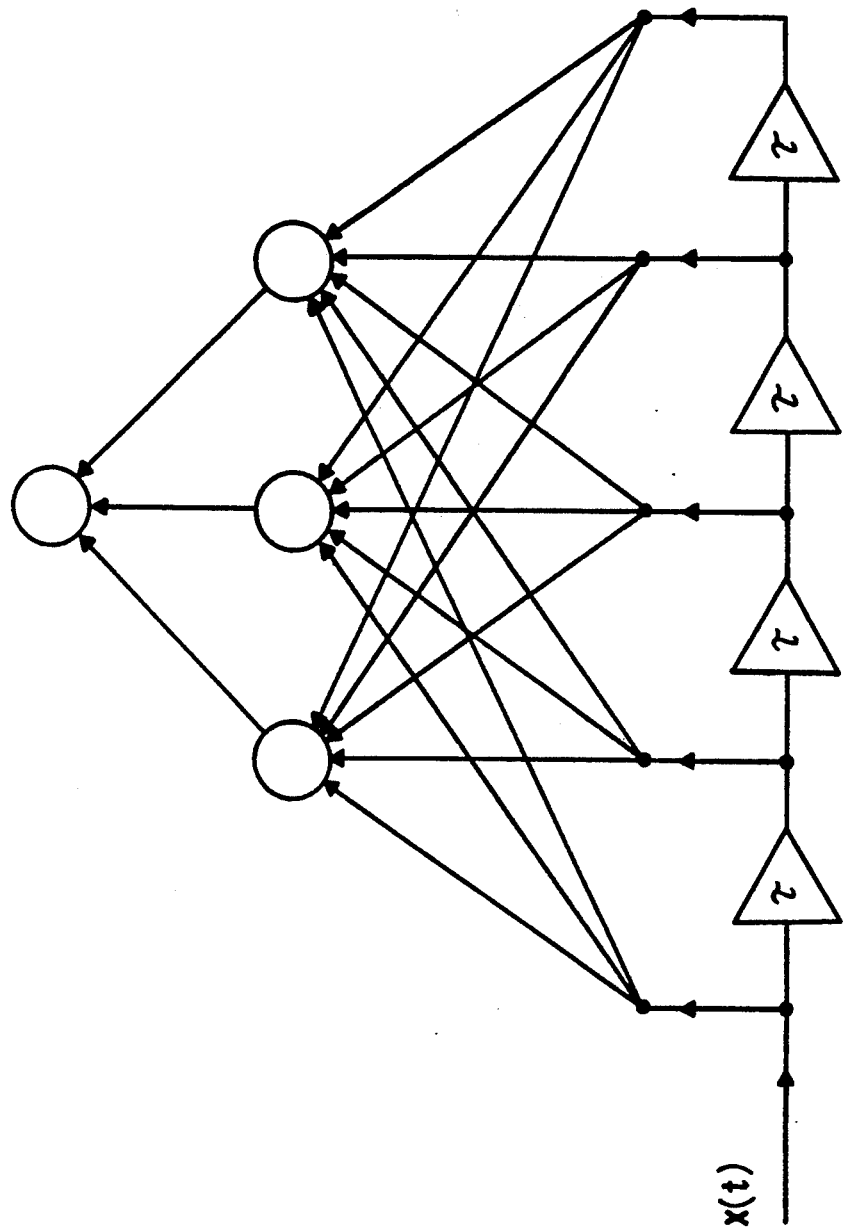
FIG. 3 shows the structure of one embodiment of a time-delay neural network according to the present invention.
Figure 4A:
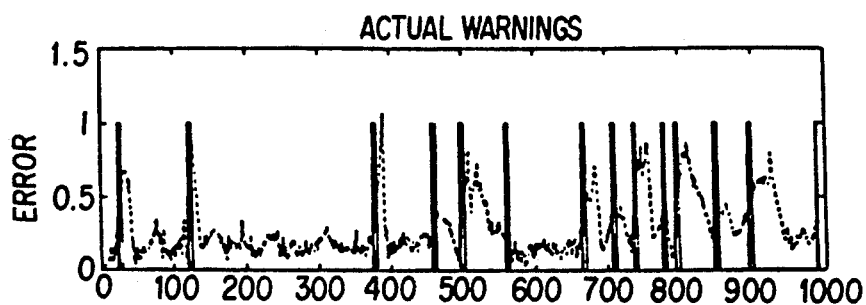
FIGS. 4A–4D graphically show the performance of the neural network NW-1-16-8 according to the present invention.
Figure 4B:
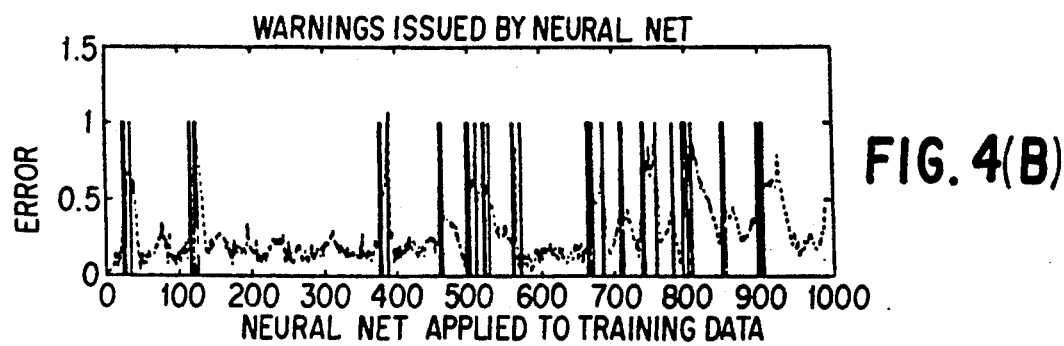
Figure 4C:
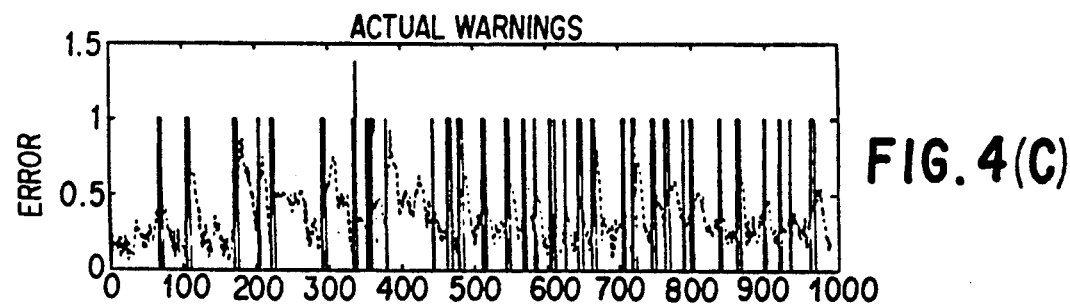
Figure 4D:
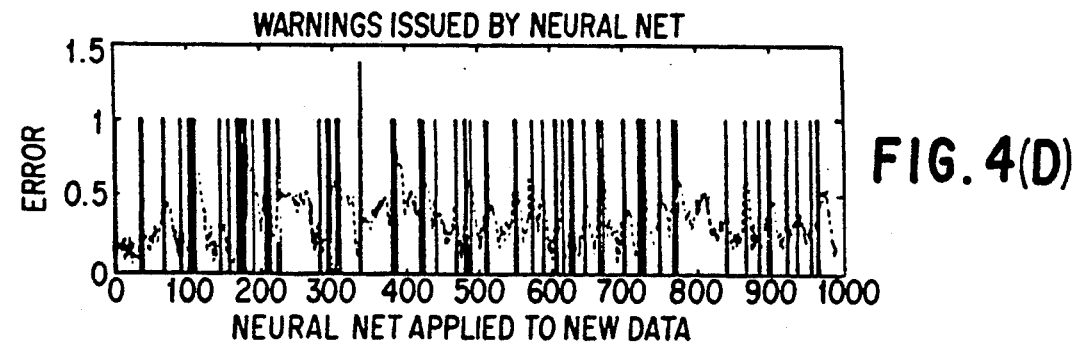

We used a back-propagation algorithm to train a time-delay neural network. FIG. 3 shows an example time-delay neural network. The time series is stored in a shift register with a fixed length T. The stored T values are than fed to the input units simultaneously.

The input to our time-delay network is Dist(t), defined as follows:

$$Dist(t) = \min_{(x,y)\in S(X_{predict}, Y_{predict}, D)} Dist(x,y,t)$$

where Dist is the square distance defined in equation 1 and $S(X_{predict}, Y_{predict}, D)$ is the search region defined in the tracking algorithm above. Dist(t) represents the best match distance between the image and the model at time t. If Dist(t) is large, the target has either deviated from the search region or changed its pose. The task of the neural network is to predict the sudden increase of Dist(t).

The time-delay network has T input nodes and one output node, The output node should warn if the input pattern foreshadows a sudden increase of Dist(t). In our experiment, the following T−1 values were fed to the network at a sampling time t:

{Dist(t−T+1)−Dist(t−T),
Dist(t−T+2)−Dist(t−T), ... ,
Dist(t−1)−Dist(t−T)}

Dist(t−T) was subtracted from each value so that the neural network learns only from the shape of the signal, not from the absolute values. Furthermore, each value is normalized to a value range between −1 and 1. This is because the logistic function used in the neural network saturates rapidly for absolute values greater than 1. The sequence is classified into two classes, NORMAL and WARNING according to the following criterion:

$$\text{IF} \left[ \frac{1}{T} \sum_{k=1}^{T} Dist(t-k) < D_{threshold} \right]$$

and $[Dist(t) > D_{threshold}] \rightarrow \text{WARNING}$ $\text{ELSE} \rightarrow \text{NORMAL}$ for a predefined value $D_{threshold} > 0$. A sequence can be classified as NORMAL even if it consists of high values. The WARNING class indicates only the transition from the normal tracking state to the mistracking state.

The use of the neural network consists of two phases: the training phase and application phase. During the training phase, a preclassified time series is fed to the network with the classification at each sampling time. The connection weights between the nodes are adjusted using the error-back propagation algorithm. In the application phase, the network is exposed to a new time series on which it is supposed to output the correct classification, thus predicting the sudden motion.

Experimental Results

Two time series of Dist(t) (DATA-1 and DATA-2) were used. Each time series contains approximately 1000 samples, corresponding to around 100 seconds. Every 2 sample points in DATA-1 were used to create the training data. That is, the samples were constructed for every other sampling time and fed to the network as the training set.

Three types of configurations were used as shown in Table 2.

TABLE 2

| | Neural Network Configuration | | | | |
|---|---|---|---|---|---|
| | Input Nodes | Hidden Nodes | Output Nodes | Learning Coefficient | Momentum |
| NW-1-8-8 | 8 | 8 | 1 | 2.0 | 0.0 |
| NW-1-12-8 | 8 | 12 | 1 | 2.0 | 0.0 |
| NW-1-16-8 | 8 | 16 | 1 | 2.0 | 0.0 |

Each of the networks were trained using about a half of the sampling points of DATA-1, i.e., every other sample points. One cycle of feeding and back-propagating all the training data (approximately 500 vectors) is called an epoch. The error ($\Sigma$(output-training)$^2$) approaches to a (possibly local) minimum for NW-1-8-8, NW-1-12-8, and NW-1-16-8, respectively. SUN4/310 and C language were used to implement the networks.

NW-1-8-8 was trapped in a local minimum. NW-1-12-8 reached the error level 4.0 while NW-1-16-8 was trapped in a minimum with an error level of 5.0. The elapsed times needed to train the network for 30000 epochs are shown in Table 3.

TABLE 3

| Training Time/30000 epochs | |
|---|---|
| Network | Elapsed Time (seconds) |
| NW-1-8-8 | 8098 |
| NW-1-12-8 | 17358 |
| NW-1-16-8 | 18589 |

The training processes were run in the lowest priority using the renice 19 command of UNIX. This may explain why NW-1-12-8 and NW-1-16-8 spent nearly the same elapsed time for training.

FIG. 4 shows how the NW-1-16-8 network issued warnings. The upper graph shows the actual classification and the lower graph the classification by the neural network. The values of the output node (0 for NORMAL and 1 for WARNING) and Dist(t) are shown.

The performance of the neural network was measured using the following criteria. (1) $W_{total}$: The total number of sampling points classified as WARNING by the neural network; (2) $W_{correct}$: The number of sampling points classified as WARNING for which at least one actual warning occurred within five sampling times; (3) $W_{incorrect}$: The number of sampling points classified as WARNING for which no actual warning occurred within five sampling times; (4) $N_{total}$: The total number of sampling points classified as NORMAL by the neural network; (4) $N_{correct}$: The number of sampling points classified as NORMAL for which no actual warning occurred within five sampling times; and (5) $N_{incorrect}$: The number of sampling points classified as NORMAL for which at least one actual warning occurred within five sampling times.

Tables 4 and 5 show the obtained statistics for the training set (DATA-1) and new data set (DATA-2) respectively.

TABLE 4

Statistics for Training Data (DATA-1)

| | $W_{correct}/W_{total}$ | $W_{incorrect}/W_{total}$ | $N_{correct}/N_{total}$ | $N_{incorrect}/N_{total}$ |
|---|---|---|---|---|
| NW-1-8-8 | 20/37 (= 0.540541) | 17/37 (= 0.459459) | 887/947 (= 0.936642) | 60/947 (= 0.063358) |
| NW-1-12-8 | 36/59 (= 0.610169) | 23/59 (= 0.389831) | 868/925 (= 0.938378) | 57/925 (= 0.061622) |
| NW-1-16-8 | 37/56 (= 0.660714) | 19/56 (= 0.339286) | 879/928 (= 0.947198) | 49/928 (= 0.052802) |

TABLE 5

Statistics for New Data (DATA-2)

| | $W_{correct}/W_{total}$ | $W_{incorrect}/W_{total}$ | $N_{correct}/N_{total}$ | $N_{incorrect}/N_{total}$ |
|---|---|---|---|---|
| NW-1-8-8 | 31/81 (= 0.382716) | 50/81 (= 0.617284) | 754/903 (= 0.834994) | 149/903 (= 0.165006) |
| NW-1-12-8 | 39/81 (= 0.481481) | 42/81 (= 0.518519) | 760/903 (= 0.841639) | 143/903 (= 0.158361) |
| NW-1-16-8 | 45/105 (= 0.428571) | 60/105 (= 0.571429) | 739/879 (= 0.840728) | 140/879 (= 0.159272) |

The prediction performance was analyzed using another criterion: $W_{actual}$=number of actual warnings and $W_{predicted}$=number of actual warnings for which at least one warning was issued by the neural network within 5 previous sampling times. Tables 6 and 7 show the obtained statistics for the training set (DATA-1) and new data set (DATA-2) respectively.

TABLE 6

The Ratio of Successful Prediction for Training Data (DATA-1)

| | $W_{predicted}/W_{actual}$ |
|---|---|
| NW-1-8-8 | 31/60 (= 0.516667) |
| NW-1-12-8 | 50/60 (= 0.833333) |
| MW-1-16-8 | 47/60 (= 0.783333) |

TABLE 7

The Ratio of Successful Prediciton for New Data (DATA-2)

| | $W_{predicted}/W_{actual}$ |
|---|---|
| NW-1-8-8 | 53/129 (= 0.410853) |
| NW-1-12-8 | 64/129 (= 0.496124) |
| NW-1-16-8 | 66/129 (= 0.511628) |

Thus, approximately 50% of the sudden motions in the new data set were predicted by the neural network with twelve or sixteen hidden nodes.

The neural network with 12 hidden nodes (NW-1-12-8) was trained to learn the patterns foreshadowing a sudden motion at time t+3. The training cycle was trapped at a local minimum with the energy value 13.0. This network was then applied to DATA-1 and DATA-2. Table 8 shows the prediction performance. The performance is lower than for predicting t+1, but still more than 40% of the sudden motions were predicted by the network.

TABLE 8

The Ratio of Successful Prediction for T + 3

| NW-1-12-8 | $W_{predicted}/W_{actual}$ |
|---|---|
| Training Data (DATA-1) | 31/60 (= 0.516667) |
| New Data (DATA-2) | 56/129 (= 0.434109) |

The feed-forward execution speed of the neural network was measured. DATA-1 (989 samples) was fed to the networks ten times for each network and the elapsed time was measured. Table 9 summarized the results. SUN4/310 was used.

TABLE 9

| | Execution Speed | |
|---|---|---|
| | Elapsed Time/Samples (seconds/samples) | Elapsed Time per Sample (seconds) |
| NW-1-8-8 | 4/9890 | 0.0004044 |
| NW-1-12-8 | 5/9890 | 0.0005056 |
| NW-1-16-8 | 7/9890 | 0.0007078 |

It took less than one milli-second per sampling point for the prediction. This speed is satisfactory for the intended purpose of sudden motion prediction, since the sampling time of the current face tracking system is around 100 msec. The computational cost of the prediction by the neural network is almost negligible. The experiment demonstrated that the neural network can predict sudden motion. The rate of correct prediction was as high as 50% for occurances of sudden motions at the next sampling time. Because the vision sampling interval is around 100 msec., this prediction gives the system 100 msec. of additional time for reaction, enabling a sophisticated retreat path planning. The use of other clues such as positions, velocity, and acceleration as the input to the neural network may enhance the longer range prediction performance.

However, a further problem is that it is very difficult to predict the position after the sudden motion. When sneezing, a person moves the head to various directions, or just turns or tilts. The simplest approach to this problem seems to increase the vision sampling speed and predict the motion more precisely using classical methods. The improvement of the responsiveness of the robot itself must be addressed separately.

D. FACE TRACKING—ONE DIMENSIONAL APPROACH

An even more computationally efficient approach to face tracking that we have recently developed involves the simple assumption that the edges of the face (or head) will exhibit an easily distinguishable contrast with the background. This method allows inexpensive and robust face tracking.

The following preconditions are assumed in this environment: (1) the user should be the only object in the scene visible from the camera except for the robot arm; (2) the background should be a white (or otherwise light) screen so that the part of the image corresponding to the user and that part corresponding to the background can be separated by intensity thresholding; (3) the user's face should mostly remain at the same height (i.e., Y-axis coordinate) in the image; (4) the user's head should for the most part move horizontally; (5) the user's head should remain vertically oriented; (6) the image plane, the distance between the center of the user's forehead and the mouth should be relatively unchanging; and (7) the robot arm should operate in the lower part of the image below the user's nose (i.e., the upper half of the user's head is never occluded by the robot arm).

In one embodiment, the image coordinate system is fixed such that x is the horizontal axis and y is the vertical axis with $(x,y)=(0,0)$ placed at the upper left corner of the image. Thus, the position of a face of a person can be automatically tracked by utilizing the following procedure to analyze images provided by the camera.

Step 1: Select an initial tracking position. The position should be around the forehead of the user. Let $X_{init}$ and $Y_{init}$ be the coordinates of the initial position in the image plane.

Step 2: Read a horizontal line on the initial point $(X_{inip} Y_{init})$. Let $X_{min}$ be the first change of the intensity from white to black. Let $X_{max}$ be the last change of the intensity from black to white. Let $X_{track}$ be $(X_{min}+X_{max})/2$.

Step 3: Read a vertical line on the point $(X_{track} Y_{init})$. Let $Y_{min}$ be the first intensity change from white to black, or if the first pixel $(Y=0)$ on the line is already black, let $Y_{min}=0$.

Step 4: Let $Y_{track}=Y_{min}+D$, where D is a predefined constant corresponding to the distance between the forehead and the mouth. Return to Step 1.

This procedure thus allows the face (or mouth) of a person to be tracked at a speed fast enough so that predictive routines, such as those designed to predict both continuous and sudden movement, are not necessary. Additionally, this method can be modified so that the threshold does not need to be determined a priori. However, the best threshold depends on the lighting condition. It is easy to incorporate an automatic threshold determination into the method. For instance, in Step 1, when the initial tracking position is chosen, one horizontal line is read, the threshold can be set to the middle value of the minimum and the maximum intensities on the line.

Further, the distance of the face from the camera can be estimated using the size of the face in the image. That is, a horizontal line can be read at $Y_{track}$. The length L between the first white-to-black edge and the last black-to-white edge corresponds to the width of the head. The distance of the face is approximately proportional to L. Thus it is possible to know the relative quantitative distance of the face from the camera.

Using the above algorithm, ISAC is able to track the face even if the user is moving very quickly, for example, during sneezing or coughing. This performance is very important in order to build a reactive control such that the robot arm can avoid collision with the user.

E. PREDICTING COLLISION AND MOTION PLANNING

The information provided by the face tracking system and motion predictor must be combined with the current knowledge of the robot-arm position and velocity to predict the potential collision. This issue is complicated because of two factors: 1) there is a control delay between the software command and actual motion of the robot, and 2) the human motion prediction necessarily involves an error. These problems can be partly overcome by inserting a safety margin in the calculation of the expected collision time. However, the responsiveness of the system can be maximized by pursuing the minimal safety margin.

Planning the trajectory of a robot arm towards a moving face raises some important issues. The trajectory should ensure that the arm does not collide with the user. On the other hand, the arm has to eventually reach a point close enough to the face to actually be able to feed the user. Collision avoidance and the goal of feeding the user thus seems to be at cross purposes.

Our approach to this conflict is to define two states for the motion planner. The planner is in tracking state as it approaches the face. A state transition to the feeding state will occur when the arm is sufficiently close to the mouth for feeding. The trajectory planning employed in these states and the conditions when a state transition occurs are of crucial importance.

The tracking state is entered when the arm decides to move towards the mouth of the user for feeding. After the initial location of the mouth is obtained, the arm starts moving towards that point. During this motion, if the face moves to a new point, the destination of the arm is changed accordingly. If the face moves towards the arm, a collision may be predicted. This in itself should not cause the arm to take evasive action unless the predicted time to collision is less than a threshold equal to the sampling time of the image times some factor of safety. If the predicted collision time is greater, the arm will have a chance after the next sampling of the image to decide whether the face is still approaching the arm and calculate a new estimation of the collision time. The assumption made here is that neither the arm nor the face change their velocities between two samples by an amount large enough to cause a collision earlier than expected. If the collision time is predicted to be under the threshold, an evasive path must be taken. Due to the requirement of urgency, a predefined trajectory must be employed, guaranteed to take the arm away from the user until the next sampling time, when the new estimated time to collision is compared with the threshold.

This approach to collision avoidance has the advantage of not being over-protective while approaching the face. In practice, the face would naturally come closer to the arm as the user tries to take food. This should not cause any evasive action to be taken.

A transition to feeding state can be made when both of the following conditions are true. First, the spoon must be sufficiently close to the mouth and second, the face is stationary, or if not, moving with a speed under the defined threshold.

During the feeding state, the collision avoidance strategy must be turned off, since it is a "collision" that is the objective of this state. A design decision to be made here is the degree to which the arm should aid the feeding process. The simplicity of letting the user move towards the food and ingesting it can be weighed against the advantages of taking a more active part in the feeding process, especially if it is difficult or impossible for the user to move.

Equally important to the responsiveness of the system is the decision to switch from the feeding state to the state of retreat from the face. This can be effected by detecting a "collision" between the face and the spoon, signifying the activity of taking food from the spoon. After a suitable time delay, the arm could start retreating. The perturbation in the arm caused by the process of feeding could also be used as a backup signal to make the transition.

Once the collision avoidance is activated, the position of the manipulator changes. In order to continue the feeding service, a new approach trajectory must be re-planned. Due to this requirement, the motion planner should be able to re-start from world states different from the original one. If there is no need to plan a complex trajectory, such as one that avoids obstacles (a flower vase on the table, etc.), the design of such a motion planner will be straightforward. The level of sophistication should be determined based on the actual need and feedback from the use of the system.

F. VISION-ARM COORDINATION

Motion planning involves coordination of the vision and manipulator control. The face tracking process runs concurrently with motion planning and control. One design embodiment envisages the existence of modules distributed across machines, communicating through the network. Therefore, coordination between these modules must be done through network communications. The desired swiftness of reactive control requires the bypass of computationally expensive processes like planning. This requirement makes it desirable to have a layered control architecture or subsumption architecture. The layered control architecture decomposes the system into behaviors. Each behavior is a simple stimuli-response module with finite internal states. The behaviors are organized such that a behavior in an upper layer can suppress the output of the lower layer behaviors, thus taking over the control.

In our case, the behaviors will be layered into Feeding, Reactive Collision Avoidance, Predictive Collision Avoidance, and Tracking. The Feeding is the highest priority behavior which suppresses the collision avoidance as described above. The Reactive Collision Avoidance moves the arm in a predefined direction away from the user whenever collision is actually detected. The Predictive Collision Avoidance controls the arm so as not to collide with the user based on the predicted motion of the user's face. The Tracking plans and executes motion based on the top-level service scenario. Each of these behaviors performs the vision-arm coordination according to their own logic. The layered priority resolves conflicts between these behaviors.

Although the present method and apparatus have been described with reference to specific details of certain embodiments thereof, it is not intended that such details should be regarded as limitations upon the scope of the invention except as and to the extent that they are included in the accompanying claims.

What is claimed is:

1. A method of automatically tracking the position of a face of a patient in real time to allow controlled feeding of the patient by a robot, comprising the steps of:
    A) positioning a camera such that the camera viewing space defines a two-dimensional image coordinate system;
    B) automatically acquiring a model image which includes an image of the face, wherein the model image comprises a first two-dimensional array of intensity points referenced to the coordinate system;
    C) selecting an initial tracking point in the model image and an initial prediction point in the model image, wherein the tracking point and the prediction point are referenced to the coordinate system;
    D) at preselected times, repeating steps E) through H) until feeding is completed;
    E) for each preselected time, automatically acquiring a scene image which includes an image of the face, wherein the scene image comprises a second two-dimensional array of intensity points referenced to the coordinate system;
    F) automatically selecting a rectangular search region within the scene image, wherein the search region comprises a subset of the second two-dimensional array of intensity points and includes the intensity point corresponding to the prediction point;
    G) automatically locating the best match point between the second intensity points in the search region and the first intensity points in the model image, wherein the best match point corresponds to the minimum of the square-distance criterion and automatically equating the best match point with the tracking point for the particular preselected time; and
    H) automatically comparing the tracking point for the particular preselected time to the tracking point of a previous preselected time to select the prediction point for the next preselected time.

2. The method of claim 1, wherein the size of the search region is optimized to enhance the speed at which the position of the face can be tracked.

3. The method of claim 1, further comprising for each cycle of repeated steps E) through G) the following steps of:
    i) storing the value of the square distance criterion associated with each first intensity point in the model image for the particular preselected time;
    ii) selecting the set of first intensity points in the model image in which the value of the square distance criterion associated with each first intensity point remains less than a predetermined threshold value for a predetermined set of preselected times to create an array of robust intensity points; and
    iii) limiting the model image first two-dimensional array to the robust intensity points to enhance the speed at which the position of the face can be tracked.

4. The method of claim 1, wherein the method of comparing the tracking point for the particular preselected time to the tracking point of a previous preselected period of time is selected from the group consisting of an autoregressive method, a constant velocity method, a constant acceleration method and a least-squares method.

5. The method of claim 1, further comprising the step of predicting sudden motion of the face by correlating a time series of at least one variable associated with sudden motion in a time-delay neural network trained with a back-propagation algorithm.

6. The method of claim 5, wherein the variable is the minimum of the square-distance criterion.

7. A method controlling in real time the position of a robotic feeding means delivering food to a patient, comprising the steps of:
A) automatically acquiring a model image which includes an image of the face of the patient surrounded by a background, wherein the model image comprises a two-dimensional array of intensity points such that the intensity values of the intensity points corresponding to the background distinguishably contrast with the intensity values of the intensity points corresponding to the edge of the face so that the intensity points corresponding to the edge of the face can be determined by intensity thresholding;
B) selecting an initial tracking point $(X_{init}, Y_{init})$ in the model image such that the initial tracking point corresponds to a position within the image of the face;
C) automatically examining the horizontal line of intensity points containing the initial point to identify the intensity point $X_{min}$, which corresponds to the intensity point that identifies the right edge of the face on the horizontal line, and to identify the intensity point $X_{max}$, which corresponds to the intensity point that identifies the left edge of the face on the horizontal line, and to identify $X_{track}$, which equals $(X_{min}+X_{max})/2$;
D) automatically examining the vertical line of intensity points containing the intensity point $(X_{track}, Y_{init})$ to identify the intensity point $Y_{min}$, which corresponds to the intensity point that identifies the top edge of the face on the vertical line;
E) setting $Y_{track}=Y_{min}+D$, wherein D is a predefined constant related to the distance between the top edge of the face and the mouth of the face, to define the tracking point $(X_{track}, Y_{track})$;
F) controlling the position of a robotic feeding means using the tracking point; and
G) at preselected times, repeating steps A) through F) to track the position of the face of the patient until the patient indicates that feeding is completed.

8. The method of claim 5 wherein a time series is stored in the time-delay neural network in a shift register having a fixed length T and having T input nodes and one output node.

9. The method of claim 7, wherein the patient indicates that feeding is completed by issuing a voice command to a speech recognition system.

10. The method of claim 7 further comprising the step of estimating the distance of the face by reading a horizontal line at $Y_{track}$, measuring a length L between the first white-to-black edge and the last black-to-white edge corresponding to the width of the head, and calculating the distance of the face from the distance L.

11. A method of automatically controlling in real time the position of a robotic feeding means delivering food to a patient, comprising the steps of:
A) positioning a camera such that the camera viewing space defines a two-dimensional image coordinate system;
B) automatically acquiring a model image which includes an image of the patient's face, wherein the model image comprises a first two-dimensional array of intensity points referenced to the coordinate system;
C) selecting an initial tracking point in the model image and an initial prediction point in the model image, wherein the tracking point and the prediction point in the model image, wherein the tracking point and the prediction point are referenced to the coordinate system;
D) at preselected times, repeating steps E) through I) until the patient indicates that feeding is completed;
E) for each preselected time, automatically acquiring a scene image which includes an image of the face, wherein the scene image comprises a second two-dimensional array of intensity points referenced to the coordinate system;
F) automatically selecting a rectangular search region within the scene image, wherein the search region comprises a subset of the second two-dimensional array of intensity points and includes the intensity point corresponding to the prediction point;
G) automatically locating the best match point between the second intensity points in the search region and the first intensity points in the model image, wherein the best match point corresponds to the minimum of the square distance criterion and automatically equating the best match point with the tracking point for the particular preselected time;
H) using the best match point to control the position of a robotic feeding means; and
I) automatically comparing the tracking point of the particular preselected time to the tracking point of a previous preselected time to select the prediction point for the next preselected time.

12. The method of claim 11, wherein the size of the search region is optimized to enhance the speed at which the position of the face can be tracked.

13. The method of claim 11, further comprising for each cycle of repeated steps E) through G) the following steps of:
i) storing the value of the square distance criterion associated with each intensity point in the model image for the particular preselected time;
ii) selecting the set of intensity points in the model image in which the value of the square distance criterion associated with each intensity point remains less than a predetermined threshold value for a predetermined set of preselected times to create an array of robust intensity points; and
iii) limiting the model image two-dimensional array to the robust intensity points to enhance the speed at which the position of the face can be tracked.

14. The method of claim 11, wherein the method of comparing the tracking point for the particular preselected time to the tracking point of a previous preselected period of time is selected from the group consisting of an auto-regressive method, a constant velocity method, a constant acceleration method, and a least squares method.

15. The method of claim 11, further comprising the step of predicting sudden motion of the face by correlating a time series of at least one variable associated with sudden motion in a time-delay neural network trained with a back-propagation algorithm.

16. The method of claim 15, wherein the variable is the minimum of the square-distance criterion.

17. The method of claim 11, wherein the patient speaks into a voice recognition means to indicate that feeding is complete.

18. The method of claim 15 wherein a time series is stored in the time-delay neural network in a shift register having a fixed length T and having T input nodes and one output node.

19. A robotic feeding apparatus for feeding a patient comprising:
  camera means for acquiring a model image which includes an image of the patient's face, wherein the model image comprises a first two-dimensional array of intensity points referenced to a two-dimensional coordinate system;
  camera positioning means for positioning the camera means to define said two-dimensional coordinate system;
  point selection means for selecting an initial tracking point in the model image and an initial prediction point in the model image, wherein the tracking point and the prediction point are referenced to the coordinate system;
  camera control means for controlling the camera means such that, at preselected times, the camera acquires a scene image which includes an image of the patient's face, wherein the scene image comprises a second two-dimensional array of intensity points referenced to the coordinate system;
  rectangle selection means for automatically selecting a rectangular search region within the scene image, wherein the search region comprises a subset of the second two-dimensional array of intensity points and includes the intensity point corresponding to the prediction point;
  match point locating and equating means for automatically locating the best match point between the second intensity points in the search region and the first intensity points in the model image, wherein the best match point corresponds to the minimum of the square distance criterion, the match point locating and equating means also for automatically equating the best match point with the tracking point for the particular preselected time;
  robotic food delivery means for delivering food to the patient's mouth in accordance with the location of the tracking point;
  prediction point selection means for automatically comparing the tracking point for the particular preselected time to the tracking point of a previous preselected time to select the prediction point for the particular preselected time; and
  repetition and sequencing means for receiving commands from the patient, and, in response thereto, controlling the acquisition of the scene image by the camera means, the selection of the rectangular search region by the rectangle selection means, the locating of the best match point and the equating of the best match point with the tracking point by the match point locating and equating means, the delivery of food to the patient's mount by the robotic food delivery means, and the selection of the prediction point by the prediction point selection means.

20. The apparatus of claim 19, wherein the repetition and sequencing means comprises voice recognition means for receiving spoken commands from the patient.

21. The apparatus of claim 19, wherein the robotic food delivery means comprises a five degree-of-freedom manipulator, and microprocessor-based pneumatic control means for controlling the manipulator in accordance with the location of the tracking point.

22. The apparatus of claim 21, wherein the five degree-of-freedom manipulator comprises joints that are controlled by a plurality of transputers.

23. The apparatus of claim 19, wherein the camera means comprises a CCD camera.

* * * * *